US011983280B2

(12) United States Patent
Hamburg et al.

(10) Patent No.: US 11,983,280 B2
(45) Date of Patent: May 14, 2024

(54) PROTECTION OF CRYPTOGRAPHIC OPERATIONS BY INTERMEDIATE RANDOMIZATION

(71) Applicant: Cryptography Research, Inc., San Jose, CA (US)

(72) Inventors: Michael Alexander Hamburg, San Francisco, CA (US); Michael Tunstall, Walnut Creek, CA (US); Michael Hutter, Vienna (AT)

(73) Assignee: Cryptography Research, Inc., San Jose, CA (US)

( * ) Notice: Subject to any disclaimer, the term of this patent is extended or adjusted under 35 U.S.C. 154(b) by 372 days.

(21) Appl. No.: 17/309,937

(22) PCT Filed: Jan. 6, 2020

(86) PCT No.: PCT/US2020/012419
§ 371 (c)(1),
(2) Date: Jul. 1, 2021

(87) PCT Pub. No.: WO2020/146285
PCT Pub. Date: Jul. 16, 2020

(65) Prior Publication Data
US 2022/0075879 A1 Mar. 10, 2022

Related U.S. Application Data

(60) Provisional application No. 62/912,416, filed on Oct. 8, 2019, provisional application No. 62/789,103, filed on Jan. 7, 2019.

(51) Int. Cl.
*G06F 21/00* (2013.01)
*G06F 7/523* (2006.01)
(Continued)

(52) U.S. Cl.
CPC .......... *G06F 21/602* (2013.01); *G06F 7/523* (2013.01); *G06F 7/588* (2013.01); *G06F 17/16* (2013.01); *G06F 21/78* (2013.01)

(58) Field of Classification Search
CPC ........ G06F 21/602; G06F 7/523; G06F 7/588; G06F 17/16; G06F 21/78; G06F 7/725;
(Continued)

(56) References Cited

U.S. PATENT DOCUMENTS 6,782,100 B1 * 8/2004 Vanstone .............. H04L 9/3252
380/278
8,559,625 B2 * 10/2013 Douguet ................ G06F 7/725
708/492

(Continued)

FOREIGN PATENT DOCUMENTS

EP 1231738 B1 1/2008

OTHER PUBLICATIONS

Notification of Transmittal of the International Search Report and the Written Opinion of the International Searching Authority, or the Declaration dated Mar. 19, 2020 re: Int'l Appln. No. PCT/US20/012419. 36 Pages.

*Primary Examiner* — Yogesh Paliwal
(74) *Attorney, Agent, or Firm* — Lowenstein Sandler LLP

(57) ABSTRACT

Aspects of the present disclosure involve a method and a system to support execution of the method to perform a cryptographic operation involving a first vector and a second vector, by projectively scaling the first vector, performing a first operation involving the scaled first vector and the second vector to obtain a third vector, generating a random number, storing the third vector in a first location, responsive to the random number having a first value, or in a second location, responsive to the random number having a second value, and performing a second operation involving a first input and a second input, wherein, based on the random
(Continued)

number having the first value or the second value, the first input is the third vector stored in the first location or the second location and the second input is a fourth vector stored in the second location or the first location.

20 Claims, 7 Drawing Sheets

(51) Int. Cl.
  *G06F 7/58* (2006.01)
  *G06F 17/16* (2006.01)
  *G06F 21/60* (2013.01)
  *G06F 21/78* (2013.01)

(58) Field of Classification Search
  CPC . H04L 9/3066; H04L 9/06; H04L 9/32; H04L 9/34
  See application file for complete search history.

(56) References Cited

U.S. PATENT DOCUMENTS

| | | | |
|---|---|---|---|
| 8,619,977 B2 | 12/2013 | Douguet et al. | |
| 8,913,739 B2* | 12/2014 | Golic | G06F 7/725 |
| | | | 713/189 |
| 2007/0177721 A1* | 8/2007 | Itoh | G06F 7/723 |
| | | | 380/28 |
| 2014/0233726 A1* | 8/2014 | Yajima | H04L 9/008 |
| | | | 380/28 |
| 2015/0207630 A1* | 7/2015 | Shimoyama | G06Q 20/40145 |
| | | | 713/186 |
| 2018/0006811 A1* | 1/2018 | Zhu | H04L 9/40 |
| 2018/0267981 A1* | 9/2018 | Sirdey | H04L 9/008 |

* cited by examiner

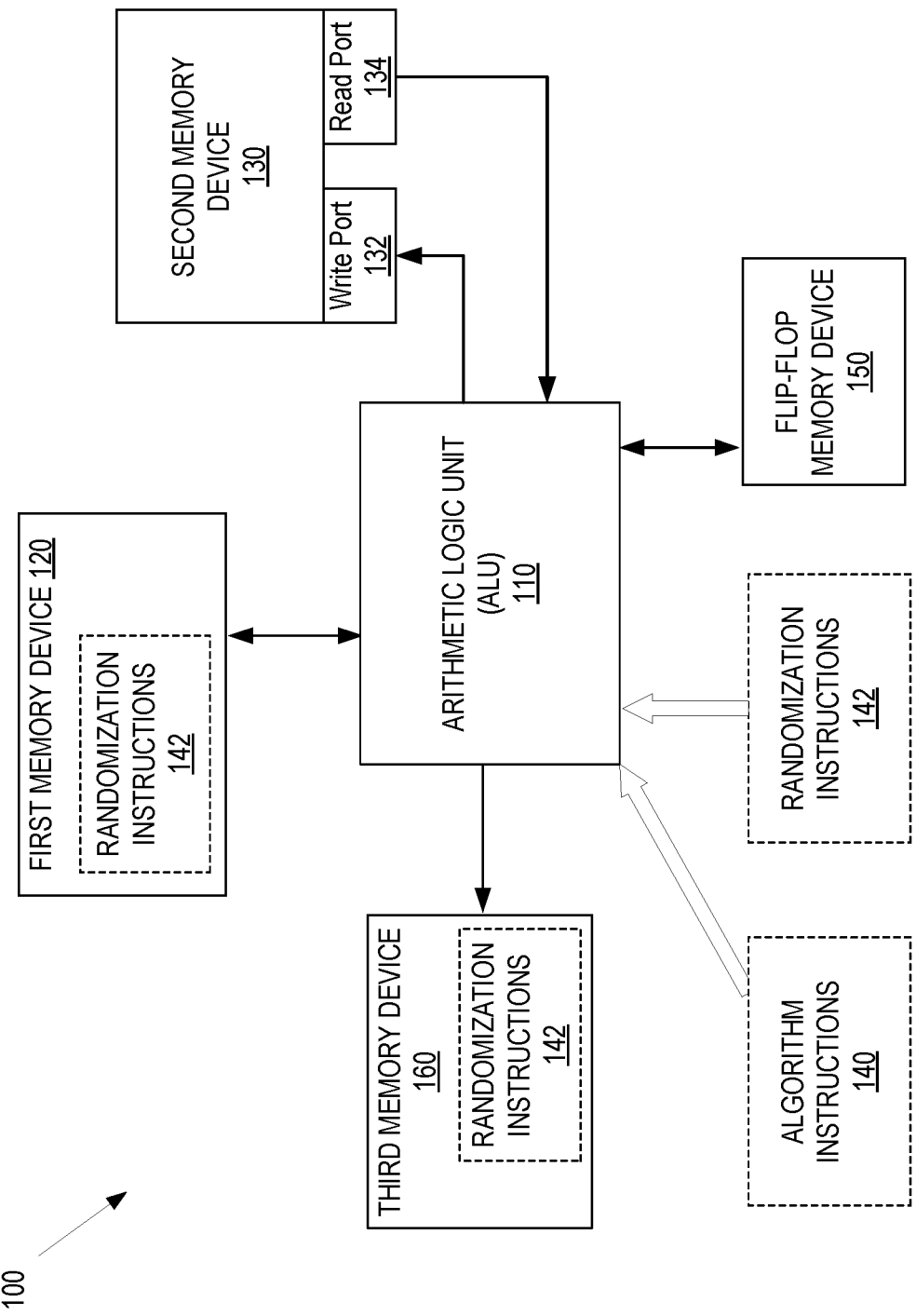

PROTECTION OF CRYPTOGRAPHIC OPERATIONS BY INTERMEDIATE RANDOMIZATION

RELATED APPLICATIONS

This application relates to U.S. Provisional Application No. 62/789,103 filed on Jan. 7, 2019, the entire contents of which are incorporated herein by reference.

TECHNICAL FIELD

The disclosure pertains to cryptographic computing applications, more specifically to protection of cryptographic operations from side-channel attacks.

BRIEF DESCRIPTION OF THE DRAWINGS

The present disclosure will be understood more fully from the detailed description given below and from the accompanying drawings of various implementations of the disclosure.

FIG. 1 is an exemplary block diagram of the components of a processing device capable of protecting cryptographic operations performed therein with intermediate randomization, in accordance with one or more aspects of the present disclosure.

DETAILED DESCRIPTION

Figure 2A:
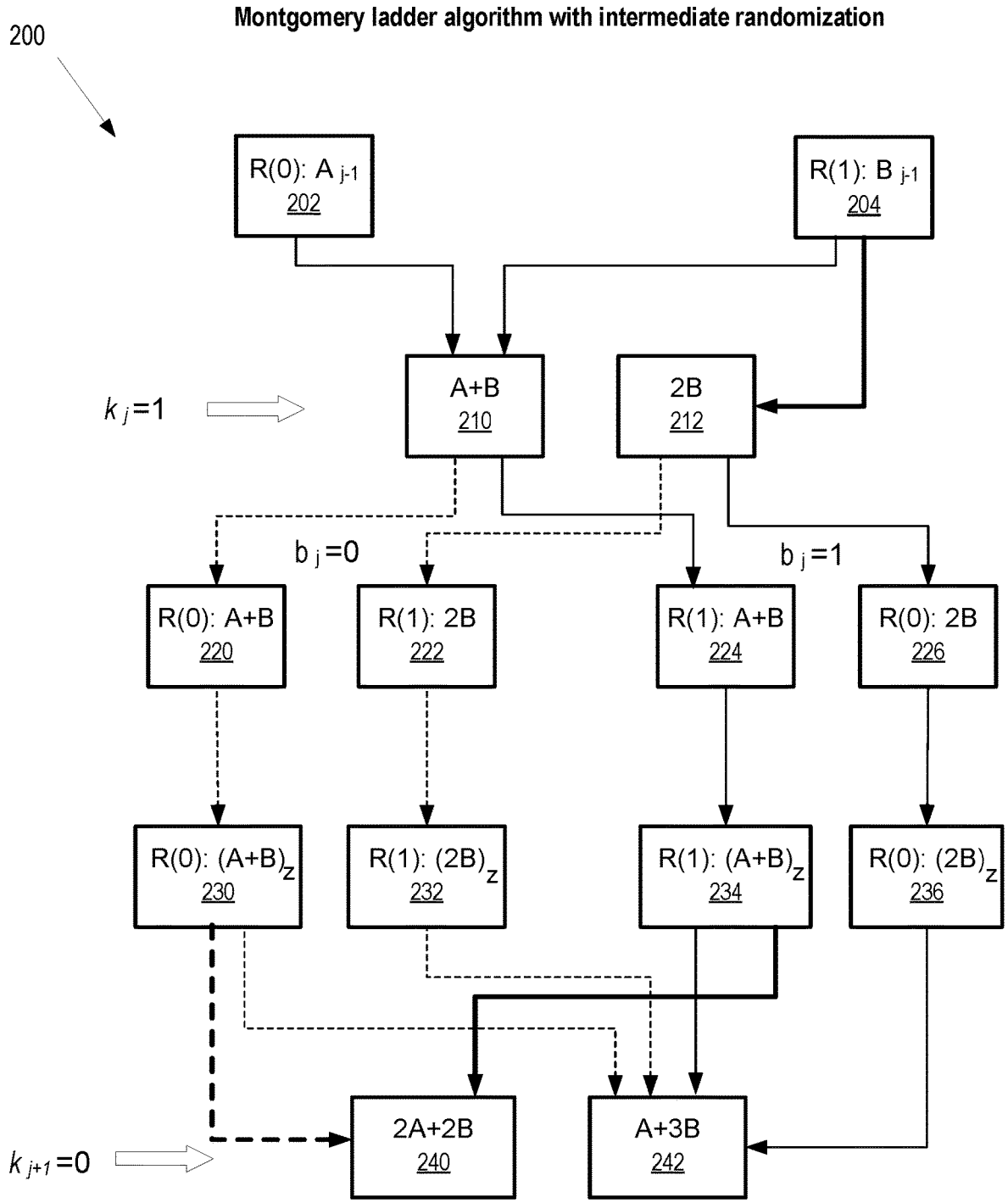
FIG. 2A illustrates an exemplary operation of the Montgomery ladder multiplication algorithm with intermediate randomization, in accordance with one or more aspects of the present disclosure.

Aspects of the present disclosure are directed to protection of arithmetic operations by intermediate randomizations that may be used in applications employing cryptographic algorithms, for safeguarding inputs and outputs of cryptographic computations against side-channel attacks.

In public-key cryptography systems, a processing device may have various components/modules used for cryptographic operations on input messages. Input messages used in such operations are often large binary numbers whose processing is sometimes performed on low-bit microprocessors, such as smart card readers, wireless sensor nodes, and so on. Examples of cryptographic operations include, but are not limited to operations involving Rivest-Shamir-Adelman (RSA) and Diffie-Hellman (DH) keys, digital signature algorithms (DSA) used to authenticate messages transmitted between nodes of the public-key cryptography system, various elliptic curve cryptography schemes, etc. Cryptographic algorithms often involve modular arithmetic operations with modulus N in which the set of all integers Z is wrapped around a circle of length N (the set $Z_N$), so that any two numbers that differ by N (or any other integer of N) are treated as the same number. As a result, a modular (modulo N) multiplication operation, AB mod N, may produce the same result for many more different sets of the multiplicand A and the multiplier B than for conventional arithmetic operations. For example, if it is known that a product of conventional multiplication of two positive integers is 6, it may then be determined that the two factors (the multiplicand and the multiplier, or vice versa) must necessarily be 2 and 3 (excluding a trivial product of 1 and the number itself, 6). In modular arithmetic, however, this is no longer the case. For example, if N=12, the same product AB mod 12=6 may result from the pairs of factors 2 and 3, 3 and 6, 5 and 6, 6 and 7, 6 and 9, and so on. This happens because 6, 18, 30, 42, 54, etc., represent the same number modulo N=12 because all these numbers differ from each other by an integer of N (in other words, when any of these integers is divided by N, the remainder of the division is the same, i.e. 6). Cryptographic applications exploit the fact that extracting the value of the private key A from a public key $P=B^A$ mod N may be a prohibitively difficult operation even when B is known, provided that A and N are sufficiently large. Similarly, a digital signature can be generated using a modular exponentiation technique. For example, when such algorithm is used as the basis of public-key cryptography, the signature S is computed in the form of the equation, $S=K^d$ mod P, where P is a public modulus, and d is a private exponent.

Many cryptographic applications employ elliptic curve multiplication which may involve operations with points (x, y) on an elliptic curve. For example, an elliptic curve f(x, y)=0 may be a Weierstrass curve where f(x, y) is a third degree polynomial in x and a second degree polynomial in y. A cryptographic operation on an elliptic curve may involve selecting a base point P (which may be a public key) and multiplying P by an integer number k (which may be a private key): Q=kP. The elliptic curve multiplication may be defined via a set of specific rules for point doubling, 2P, point addition ($P_1+P_2$), zero (infinity) point, and so on. The strength of the elliptic curve cryptography is rooted in the fact that for large values of k, the resulting point Q can be practically anywhere on the elliptic curve. As a result, the inverse operation to determine an unknown value of the private key k from a known value Q (referred to as the discrete logarithm of Q to base P: $k=\log_P Q$), can be a prohibitively difficult computational operation.

To avoid implementing the multiplication Q=kP via k loop iterations, a number of ladder-type algorithms may be used which require a significantly reduced number of loop iterations (generally, about $\log_2 k$ iterations). For example, in the Montgomery ladder algorithm, two registers, e.g., R(0) and R(1), may be used to store the accumulator value A and an auxiliary value B, with one doubling and one addition operation performed at each iteration. Prior to the first iteration, the accumulator value may be set to zero, A [R(0)]→0, and the auxiliary value B may be set to P: B [R(1)]→P. In each iteration j, starting from the most significant non-zero bit, the Montgomery ladder algorithm adds the auxiliary value B to the accumulator value and doubles the auxiliary value B, if accumulator value A if the respective key bit is set, $k_j=1$. If the key bit is zero, $k_j=0$, the algorithm adds the accumulator value A to the auxiliary value and doubles the accumulator value A:

$$A \leftarrow A+B, B \leftarrow 2B, \text{ if } k_j=1;$$

$$A \leftarrow 2A, B \leftarrow A+B, \text{ if } k_j=0.$$

After the final iteration, the algorithm returns the accumulator value A as the result of the multiplication Q=kP.

For example, if the key is k=41, represented with six bits, k=(101001), the multiplication Q=kP may give rise to six iterations summarized in the following table.

| Input: | k | A ← 0 | B ← P |
|---|---|---|---|
| | 1 | Add: 0 + P = P | Double: 2P |
| | | A ← P | B ← 2P |
| | 0 | Double: 2P | Add: P + 2P = 3P |
| | | A ← 2P | B ← 3P |
| | 1 | Add: 2P + 3P = 5P | Double: 6P |
| | | A ← 5P | B ← 6P |
| | 0 | Double: 10P | Add: 5P + 6P = 11P |
| | | A ← 10P | B ← 11P |
| | 0 | Double: 20P | Add: 10P + 11P = 21P |
| | | A ← 20P | B ← 21P |
| | 1 | Add: 20P + 21P = 41P | Double: 42P |
| | | A ← 41P | B ← 42P |
| Output: | | Read result from A: | |
| | | Q ← 41P | |

Because the iterations of the Montgomery ladder algorithm keep the difference between A and B invariant, this allows to perform elliptic curve multiplications using only one of the coordinates (e.g., x) and elide the other coordinate (e.g., y).

As another example, in the Double-Add ladder algorithm, the second register R(1) may store the same auxiliary value P across all loop iterations. The first register may store the accumulator value A that is doubled at each new iteration. If the key bit is set, k 1=1, the constant value B stored in the second register is also added to the new accumulator value:

$$A \leftarrow 2A+B, \text{ if } k_j=1;$$

$$A \leftarrow 2A, \text{ if } k_j=0.$$

After the final iteration, the algorithm returns the accumulator value A, which represents the result of the multiplication Q=kP. For the same example of k=41, the Double-Add algorithm gives rise to following six iterations.

| Input: | k | A ← 0 | B ← P |
|---|---|---|---|
| | 1 | Double & Add: 0 + P = P | No change |
| | | A ← P | |
| | 0 | Double: 2P | No change |
| | | A ← 2P | |
| | 1 | Double & Add: 4P + P = 5P | No change |
| | | A ← 5P | |
| | 0 | Double: 10P | No change |
| | | A ← 10P | |
| | 0 | Double: 20P | No change |
| | | A ← 20P | |
| | 1 | Double & Add: 40P + P = 41P | No change |
| | | A ← 41P | |
| Output: | | Read result from A: | |
| | | Q ← 41P | |

Compared to the Double-Add algorithm, the Montgomery ladder algorithm has an advantage that the doubling and addition operations at each iteration (ladder step) can be performed independently, e.g., by two separate parallel processors.

As another example, in the Joye Double-Add ladder algorithm, the iterations may be performed in the reverse order, from right to left, starting from the least significant bit. The register R(0) may store the accumulator value A (initially set to zero) and the register R(1) may store the auxiliary value (initially set to P). If the key bit is set, k 1=1, the double-and-add operation is performed on the value A, but if the key bit is clear, the double-and-add operation is performed on the value B:

$$A \leftarrow 2A+B, B \leftarrow B, \text{ if } k\,j=1;$$

$$A \square A, B \leftarrow 2B+A, \text{ if } k_j=0.$$

After the final iteration, the algorithm returns the accumulator value A, which represents the result of the multiplication Q=kP. For the example of k=42, represented with six bits, k=(101010), the multiplication Q=kP may give rise to six iterations summarized in the following table the Joye Double-Add algorithm gives rise to following six iterations (to be performed from the bottom up):

| Output: | | Read result from A: | |
|---|---|---|---|
| | | Q ← 42P | |
| | 1 | Double & Add: 20P + 22P | No change: |
| | | A ← 42P | B ← 22P |
| | 0 | No change: | Double & Add: 12P + 10P |
| | | A ← 10P | B ← 22P |
| | 1 | Double & Add: 4P + 6P | No change: |
| | | A ← 10P | B ← 6P |
| | 0 | No change: | Double & Add: 4P + 2P |
| | | A ← 2P | B ← 6P |
| | 1 | Double & Add: 0 + 2P | No change: |
| | | A ← 2P | B ← 2P |
| | 0 | No change: | Double & Add: 2P + 0 = 2P |
| | | A ← 0 | B ← 2P |
| Input: | k | A ← 0 | B ← P |

In some implementations, various other algorithms may be used, such as right-to-left binary method, conjugate co-Z addition method, left-to-right scalar multiplication, the Gounday-Joye-Miyaji ladder, and so on. In some algorithms, three (or more) registers may be used, with one register to store an accumulator value, and two (or more) registers to store two (or more) auxiliary values.

Even though solving a discrete logarithm problem may be a prohibitively difficult task, elliptic curve cryptography operations may be vulnerable to side-channel attacks. A side-channel attack may be performed by monitoring emissions (signals) produced by electronic circuits of the target's (victim's) computer. Such signals may be acoustic, electric, magnetic, optical, thermal, and so on. By recording emissions, a hardware trojan and/or malicious software may be capable of correlating specific processor (and/or memory) activity with operations carried out by the processor. For example, a trojan may be capable of identifying that an elliptic curve cryptographic application has m iterations. The attacker employing trojan may infer from this that the private key number is such that $k \leq 2^{m-1}$ (or to make even more definitive prediction that the private key resides within the interval $2^{m-1} \leq k \leq 2^m - 1$, if the algorithm starts with the iteration that corresponds to the most significant non-zero bit of the key). Within each iteration, the trojan may further identify a difference between emissions corresponding to a doubling operation and emissions corresponding to an addition operation. This may be sufficient for the trojan to determine the entire sequence of the bits representing the private key number k.

Aspects of the present disclosure address this and other shortcomings of the conventional cryptographic operations by implementing intermediate randomizations during iterations of the computational algorithm being used. For example, a processing device performing randomization protection may implement random projective scaling of various numbers encountered during various iterations so that the digital representation of these numbers is modified without modifying the objects (e.g., respective points on elliptic curves) that these numbers identify. Additionally, the processing device may perform randomized storage of intermediate outputs (such as the values of the accumulator and the auxiliary value) and control the subsequent read/load operations so that the correct dataflow is preserved. Such randomized protective measures improve the security of cryptographic operations by making it more difficult for side-channel attackers to correlate the signals emitted by the processing device during computation.

FIG. 1 is an exemplary block diagram of the components of a processing device 100 capable of protecting cryptographic operations performed therein with intermediate randomization, in accordance with one or more aspects of the present disclosure. "Processing device" refers to a device capable of executing instructions encoding arithmetic, logical, or I/O operations. In one illustrative example, a processing device may follow Von Neumann architectural model and may include an arithmetic logic unit (ALU), a control unit, and a plurality of registers. In a further aspect, a processing device may be a single core processor which is typically capable of executing one instruction at a time (or process a single pipeline of instructions), or a multi-core processor which may simultaneously execute multiple instructions. In another aspect, a processing device may be implemented as a single integrated circuit, two or more integrated circuits, or may be a component of a multi-chip module. "Memory device" herein refers to a volatile or non-volatile memory, such as random-access memory (RAM), read-only memory (ROM), electrically erasable programmable read-only memory (EEPROM), flash memory, flip-flop memory, or any other device capable of storing data.

As shown in FIG. 1, the processing device 100 may include, among other components, an ALU 110. The ALU 110 may be any digital electronic circuit capable of performing arithmetic and bitwise operations on integer binary numbers. The ALU 110 may be a component part of a bigger computing device, such as a central processing unit (CPU), which in turn may be a part of any server, desktop, laptop, tablet, phone, or any other type of computing device. The computing device may include multiple ALUs 110 and CPUs. The ALU 110 may receive input in the form of data operands from one or more memory devices, such as the memory devices 120, 130, 150, and 160. The ALU 110 may also receive code/instructions input such as the algorithm instructions 140. The algorithm instructions 140 may identify the computations algorithm to be implemented (e.g., Montgomery ladder, the Double-Add ladder, etc.) and indicate the nature and order of operations to be performed on input data operands. The ALU 110 may further receive randomization instructions 142. The randomization instructions 142 may indicate how various randomization measures are to be performed (e.g., random projective scaling, random storage of intermediate outputs, readout procedures for retrieving randomly stored intermediate outputs, and so on). The algorithm instructions 140 and/or the randomization instructions 142 may also indicate, what memory devices are to store the output of the ALU operations, and so on. In some implementations, the algorithm instructions 140 and the randomization instructions 142 may be combined in a single set of instructions. In some implementations, the algorithm instructions 140 and the randomization instructions 142 may be stored separately on separate memory devices.

In one exemplary implementation, the numbers A and B may be stored in a first memory device 120, which may be a RAM (e.g. SRAM or DRAM) device in one implementation. In other implementations, the first memory device 120 may be a flash memory device (NAND, NOR, 3DXP, or other type of flash memory) or any other type of memory. In one implementation, the first memory device 120 may have one input/output port and may be capable of receiving (via a write operation) or providing (via a read operation) a single operand to the ALU 110 per clock cycle. In such implementations, to perform both a read operation and a write operation involving the first memory device 120, a minimum of two clock cycles may be required.

A second memory device 130 may be a scratchpad memory device, in one implementation. The scratchpad may be any type of a high-speed memory circuit that may be used for temporary storage of data capable of being retrieved rapidly. To facilitate rapid exchange of data with the ALU 110, the second memory device 130 may be equipped with multiple ports, e.g., a write port 132 and a read port 134, in one implementation. Each port may facilitate one operation per clock cycle.

The numbers A and B may be may be represented by n*W bits grouped into n words with W bits in each word. The size of the word W may be determined by micro-architectural properties of a processor performing multiplication, e.g., by an arithmetic logic unit (ALU) of the processor. For example, in one implementation, a number may be represented with n=8 words of W=32 bits in each word, for the total of 256 bits in the number. Per each clock cycle, the ALU 110 may load one word from the second memory device 130 (via a read port 134) and may output one word to the second memory device 130 (via a write port 132). In one implementation, the second memory device 130 may be used for storing accumulators during execution of various arithmetic operations, such as addition, subtraction, and multiplication, including Montgomery reduction.

In some implementations, the processing device 100 may have an additional memory device, which may be a flip-flop memory device 150. The flip-flop memory device 150 may be any electronic circuit having stable states to store binary data, which may be changed by appropriate input signals. The flip-flop memory device 150 may be used for storing carries during execution of addition, subtraction, and/or multiplication, in some implementations. In some implementations, the processing device 100 may optionally have a third memory device 160, which may be any aforementioned type of memory device. The third memory device 160 may be used to store results of intermediate steps of arithmetic operations and/or final results of such operations, in one implementaion. In some implementations, the third memory device 160 may be absent, and the intermediate/final results may be stored in the second memory device 130 (e.g., the scratchpad memory) or written to the first memory device 120, in one implementation. In some implementations, the first memory device 120 and/or the third memory device 160 may store randomization instructions 142 (and/or algorithm instructions 140, not shown) for the ALU 110, as depicted in FIG. 1.

In some implementations, the accumulator A may be stored in the second memory device 130 to allow the fastest write/read access. In some implementations, the auxiliary number B may be stored in the flip-flop memory device 150 and may be overwritten after every iteration of the algorithm (e.g., as in the case of the Montgomery ladder) or remain fixed (as in the case of the Double-Add ladder). In some implementations, random numbers (to indicate how randomization operations are to be performed) may be stored in the flip-flop memory and may remain there until the next read operation. In some implementations, the successive bits of the key number k may be stored in the flip-flop memory and may be overwritten at the beginning of the next iteration. In some implementations, the bits of the key number k may be stored in the second memory device. In some implementations, any or all of the accumulator, the auxiliary number, the random numbers, an the key number k may be stored in the first memory device.

FIG. 2A illustrates an exemplary operation 200 of the Montgomery ladder multiplication algorithm with intermediate randomization, in accordance with one or more aspects of the present disclosure. The exemplary operation 200 may be performed by one or more processing devices 100, in some implementations. The input of the exemplary operation 200 may include a number k and a number P. In some implementation, the number k may be a private key represented by a sequence of bits ($k_0 k_1 k_2 k_3 \ldots$). The number P may be a public number. The number P may represent a point on an elliptic curve that may be identified by affine coordinates (x, y). In some implementations, the point (x, y) on the elliptic curve may be identified with projective (e.g., Jacobian) coordinates whose number exceeds two. For example, the number P specifying the point (x, y) on the elliptic curve may have three components (X, Y, Z) with the corresponding affine coordinate determined as $(x, y)=(X/Z^2, Y/Z^3)$. The value Z may be chosen to be an arbitrary (nonzero) number. This may allow projective scaling of the projective coordinates with an arbitrary value Z at various stages of the algorithm that uses intermediate randomization. For example, at the start of the algorithm, the point P may be represented as P=(x, y, 1), but at a later stage of the algorithm the projective coordinates may be scaled by an arbitrary number Z such that $(x, y, 1) \rightarrow (xZ^2, yZ^3, Z)$. In other implementations based on other geometric curves, a different projective scaling may be used.

As described above, the multiplication Q=kP may be performed using a number of iterations determined by the number of bits in the binary representation of k. The iterations may be performed by a processing device (e.g., ALU 110) having access to two (or more) memory registers, e.g., registers R(0) and R(1). In some implementations, the registers R(0) and R(1) may be separate physical memory devices. In some implementations, the registers R(0) and R(1) may be virtual registers implemented in the first memory device 120, the second memory device 130, the third memory device 160, the flip-flop memory device 150, and so on. In some implementations, the registers R(0) and R(1) may be some memory addresses accessible to the processing device. One of the registers, e.g., R(0), may be used to store the accumulator value A (which may initially be set to zero). The other register, e.g. R(1), may be used to store the auxiliary value B, such as B=A+P in the Montgomery ladder algorithm. In some implementations, register R(1) can store a base point P or some other value. In some implementations, additional registers, R(2), R(3) . . . , may store some additional values, as may be required or optional for a given algorithm being implemented. In some implementations of the Montgomery ladder algorithm with intermediate randomization, the values stored in the two registers may be swapped (shuffled), so that the register R(1) may be to store the accumulator value A whereas the register R(0) is to store the auxiliary value B. The registers R(0) and R(1) may include multiple sub-registers (virtual sub-registers, memory addresses, etc.), with each of the multiple sub-registers storing one of the affine (x, y) or projective (X, Y, Z) coordinates corresponding to the respective point (A or B) on the elliptic curve. Herein, when it is referred (in a singular) to reading/storing/swapping/etc. of a value (number) A and/or a value (number) B, it shall be implied that the respective operations may be performed on multiple (e.g., all) components of the corresponding number(s). In case of elliptic curve computations, it shall further be implied, when referred to an add operation (e.g., A+B) or a double operation (e.g., 2A or 2B), that a set of specific "add" or "double" elliptic curve instructions may be followed to determine the coordinates (e.g., Jacobian or affine) of the output points from the coordinates of the input points. Such instructions may be standard elliptic curve instructions where the coordinates of the result of an "add" or a "double" operation may differ from a simple sum or a double of the coordinates of the corresponding input points.

Prior to a start of a j-th iteration of the algorithm, the processing device may access the value of the bit $k_j$ and perform the double and add operations on the values stored in R(0) and R(1), as described above. For example, assuming for concreteness that $k_j=1$, the processing device may read the values stored in both registers (202 and 204), as indicated schematically by thin solid lines in FIG. 2A, and determine the sum A+B (210) and the double of the auxiliary value stored in R(1) (212), as indicated schematically by the thick solid line in FIG. 2A. Rather than directly storing in R(0) the number A+B as the new accumulator value and the number 2B in R(1) as the new auxiliary value, the processing device performing the cryptographic operation 200 may implement additional steps to protect the operation from side-channel attacks by using intermediate randomization.

For example, the processing device may use a random number generator to generate a random number. The random number may be a one-bit number $b_j$, with the subscript j indicating the iteration of the loop. In some implementations, the value of the random bit $b_j=1$ may indicate that a swapping of the results of the double/add computation is to be performed, whereas the value of the random bit $b_j=0$ may indicate to the processing device that no swapping is to be done. More specifically, if the processing device determines that $b_j=0$, the processing device may store the accumulator value A+B in register R(0) (220) and store the new auxiliary value 2B in register R(1) (222). If, however, the processing device determines that $b_j=1$, the processing device may store the accumulator value A+B in register R(1) (224) and store the new auxiliary value 2B in register R(0) (226). This randomization of outputs makes it harder for an adversary attempting a side-channel attack to determine reliably the value of the key bit $k_j$. This is because the storage of the outputs A+B and 2B in randomly chosen registers R(0) and R(1) makes it harder for the adversary to correlate emissions (e.g., power consumption) with the outcome of the computational operations 210 and 212.

Prior to starting a computational double/add block of the next iteration $k_{j+1}$, the processing device may perform additional randomization of the values stored in R(0) and R(1) by performing random projective scaling. For example, the value stored in register R(0) may be projectively scaled with some random number $Z_{R(0)}$ that may be produced by the random number generator, as schematically shown by blocks 230 and 236. Similarly, the value stored in R(1) may be projectively scaled with a random number $Z_{R(1)}$ that may be produced by the random number generator, as schematically shown by blocks 232 and 234. The random numbers $Z_{R(0)}$ and $Z_{R(1)}$ may be different in some implementations. In other implementations, the numbers $Z_{R(0)}$ and $Z_{R(1)}$ may be the same, so that the random number generator has to be invoked once. The numbers $Z_{R(0)}$ and $Z_{R(1)}$ may be short numbers, e.g., single-word-long numbers, so that the additional computations required to perform projective scaling in blocks 230, 232, 234, and 236 are minimized while still serving the purpose of randomizing the data flow of the operation 200. In some implementations, only one of the numbers $Z_{R(0)}$ and $Z_{R(1)}$ may be generated and only one of the values stored in R(0) or R(1) may be projectively scaled. In some implementations, the decision which value is to be scaled may be based on generation of an additional random number $c_j$, which may be independent from the random bit $b_j$ that controls the swapping. In such implementations, the random number generator may generate a random (single-word or multi-word) number Z and a random number c 1 to determine to which of the two registers R(0) or R(1) the random number Z is to be applied.

At the beginning of the next, j+1-th, iteration of the algorithm, the processing device may retrieve the current value of the accumulator value and the auxiliary value stored in R(0) and R(1). The processing device may have to account for a possibility that the shuffle operation during the previous j-th iteration may have resulted the accumulator value being stored in R(1) and the auxiliary value being stored in R(0). To preserve the correct dataflow, the processing device may access the value of the random number $b_j$ and load the numbers from R(0) and R(1) in a manner that depends on whether $b_j=0$ or $b_j=1$. For example, assuming for the sake of illustration, that $k_{j+1}=0$, the processing device may determine that during the previous iteration of the algorithm the random number had the value b 1=0. The processing device may compute the value 2R(0) and identify it is the new value of the accumulator 240 (that is equal to 2A+2B, in the current illustration), as indicated by the thick dashed line in FIG. 2A. The processing device may further compute the value R(0)+R(1) (that is equal to A+3B) and determine it to be the new auxiliary number 242, as illustrated by the thin dashed lines in FIG. 2A. If, on the other hand, the processing device assesses that during the previous iteration of the algorithm the random number had the value $b_j=1$, the processing device may compute the value 2R(1) and identify it as the new accumulator 240, as indicated by the thick solid line in FIG. 2A. Similarly to the scenario where $b_j=0$, the processing device may compute the value R(0)+R(1) and identify this value as the new auxiliary value 242. Because in the Montgomery ladder algorithm the value R(0)+R(1) is computed at each iteration independent of the value of the random number $b_j$, R(0)+R(1) may be computed before (or in parallel) with determination of the value $b_j$. Similarly, in a situation where $k_{j+1}=1$, the processing device may compute the value R(0)+R(1) and identify this value as the new accumulator value regardless of the value of the random bit $b_j$. On the other hand, the new auxiliary value will be dependent on the value of $b_j$ and may be equal to 2R(1) for the unshuffled case of $b_j=1$, and equal to 2R(0) for the shuffled case of $b_j=0$.

The determined values of the accumulator 240 and the auxiliary number 242 may then be stored in a manner described above in relation to the j-th iteration. Specifically, the processing device may use the random number generator to generate a new random number $b_{j+1}$ and determine, based on b j+1, how the accumulator 240 and the auxiliary number 242 are to be stored in R(0) and R(1). If b j+1=0 (no swapping), the accumulator 240 may be stored in register R(0) and the auxiliary number 242 may be stored in register R(1). If $b_{j+1}=1$ (swapping), the accumulator 240 may be stored in register R(1) and the auxiliary number 242 may be stored in register R(0).

The operations performed by the processing device during the j+1-th iteration may be summarized as follows, in one exemplary implementation, wherein the notation $R_j(n)$ stands for the content of the n-th register after the j-th iteration of the Montgomery ladder algorithm:

$$R_{j+1}(b_{j+1} XOR k_{j+1} XOR 1) \leftarrow R_j(0) + R_j(1),$$

$$R_{j+1}(b_{j+1} XOR k_{j+1} XOR 0) \leftarrow 2R_j(k_{j+1} XOR b_j).$$

Figure 2B:
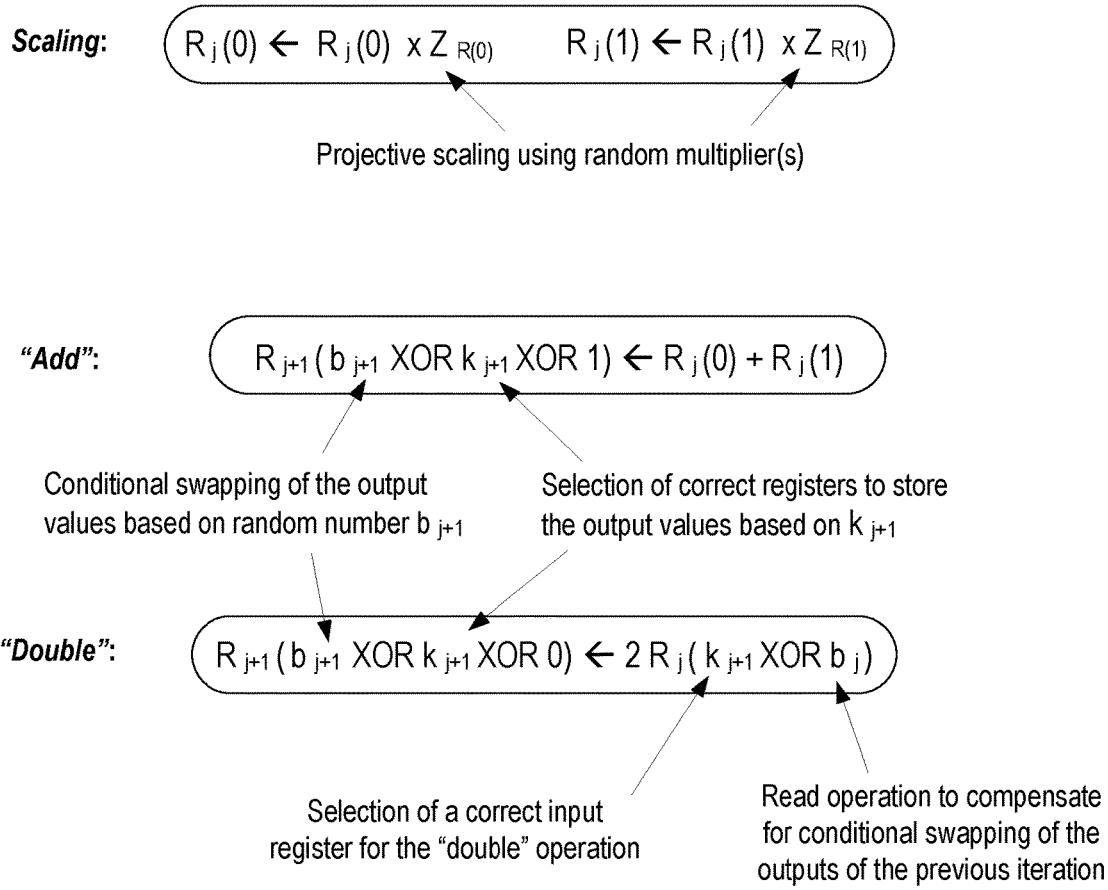
FIG. 2B illustrates intermediate randomization operations, in accordance with one or more aspects of the present disclosure, that may be implemented to protect execution of the Montgomery ladder algorithm from side-channel attacks.

FIG. 2B illustrates these intermediate randomization operations 250, in accordance with one or more aspects of the present disclosure, which may be implemented to protect execution of the Montgomery ladder algorithm from side-channel attacks. The operations 250, as illustrated in FIG. 2B may include: adjustment of the read operations to compensate for the randomization (swapping) that may have been performed at the end of the previous j-th iteration; selection of a correct input register for the "double" operation of the j+1-th iteration; selection of correct registers to store the output values of the j+1-th iteration based on the key bit value $k_{j+1}$; and conditional swapping of the output values of the j+1-th iteration based on the value of a random $b_{j+1}$. Also shown in FIG. 2B is the projective scaling performed at the end of the previous j-th iteration. It shall be noted, however, that in other possible implementations projective scaling may be performed in a different order than that shown in FIG. 2B, since projective scaling does not change the location of the corresponding point(s) on the elliptic curve. For example, projective scaling may be performed after the input values are read from the registers R(0) and R(1) during the j+1-th iteration but before the "double" and/or "add" operations are performed. As another example, projective scaling may be implemented after the "double" and/or "add" operations are performed (but prior to storing the output values in the registers), and so on. Additional projective scaling may be performed at the end of all iterations of the algorithm.

Figure 3A:
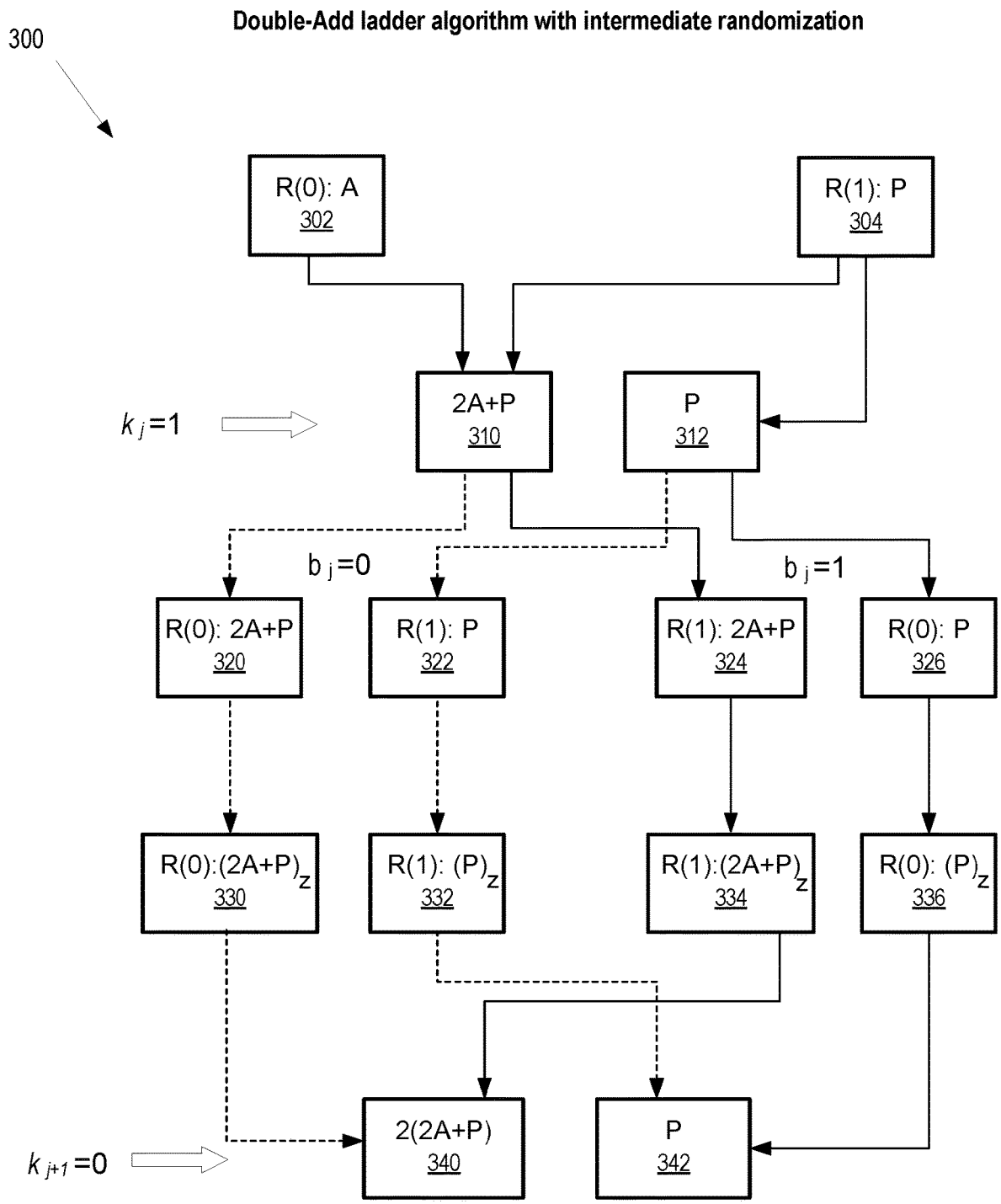
FIG. 3A illustrates an exemplary operation of the Double-Add ladder multiplication algorithm with intermediate randomization, in accordance with one or more aspects of the present disclosure.

FIG. 3A illustrates an exemplary operation 300 of the Double-Add ladder multiplication algorithm with intermediate randomization, in accordance with one or more aspects of the present disclosure. The exemplary operation 300 may be performed by one or more processing devices 100, in some implementations. Similar to the Montgomery ladder algorithm of FIG. 2A, the input of the exemplary Double-Add ladder operation 300 may include a number P and a number k, which may be a private key represented by a sequence of bits $k=(k_0 k_1 k_2 k_3 \ldots)$. The number P may be a public number. The number P may represent a point on an elliptic curve that may be identified by affine coordinates (x, y) and/or a set of projective (e.g., Jacobian) coordinates. Everything described above in relation to representation of the number P in the Montgomery ladder algorithms shall be understood to apply to the Double-Add ladder algorithm as well.

The iterations of the Double-Add ladder algorithm may be performed by the processing device (e.g., ALU 110) having access to two (or more) memory registers, e.g., registers R(0) and R(1), which may be similar (in implementation and function) to the registers R(0) and R(1) described in relation to the Montgomery ladder algorithm. One of the registers, e.g., R(0), may be used to store the accumulator value A (which may initially be set to zero). The other register, e.g. R(1), may be used to store an auxiliary value, which in the Double-Add algorithm may be a value, such as the value of base point P, that is to remain fixed for all iterations of the algorithm. However, in implementations of the Double-Add ladder algorithm with intermediate randomization, as disclosed herein, the values stored in the two registers may be shuffled, so that the register R(1) may, at times, store the accumulator value A whereas the register R(0) may store the fixed auxiliary value P. Furthermore, the auxiliary value P (and/or the accumulator value) may be projectively scaled at various stages of the Double-Add algorithm. As a result of projective scaling, the projective coordinates (e.g., X, Y, Z) representing the value P (or, similarly, the accumulator value) may be changed provided that they correspond to the unchanged set of the affine coordinates (x, y) on the elliptic curve. As in the case of the Montgomery ladder, various multiplication (e.g., doubling, scaling) or addition operations shall be understood to refer to multiple components (e.g., various projective and/or affine coordinates) of the value P (and the accumulator value), if applicable. In some implementations, projective coordinates may have 4 or more components (e.g. X, Y, Z, W, . . . ), with the additional coordinates describing, for example, a slope of a line connecting the point identified by the coordinates to some reference point (e.g., the base point P), or other values, as may be prescribed by the specific algorithm being implemented.

Prior to a start of a j-th iteration of the algorithm, the processing device performing exemplary cryptographic operation 300 may access the value of the bit $k_j$ and perform the double or double-and-add operation on the values stored in one of R(0) or R(1). For example, assuming for concreteness that $k_j$=1, the processing device may read the values stored in both registers, as indicated schematically by solid lines in FIG. 3A, and determine the sum 2A+P (310) while keeping the value P stored in R(1) unchanged (312). Rather than storing the number 2A+P as the new accumulator value, the processing device performing the cryptographic operation 300 may implement additional steps to protect the operation from side-channel attacks by using intermediate randomization.

For example, the processing device may use a random number generator to generate a random number (e.g. a one-bit) number $b_j$. In some implementations, the value of the random bit $b_j$=1 may indicate that a shuffle of the results of the computations 310 and 312 is to be performed, while the value $b_j$=0 may indicate no swapping. More specifically, if the processing device determines that $b_j$=0, the processing device may store the accumulator value 2A+P in register R(0) (320) and keep the fixed value P in register R(1) (322). If, however, the processing device determines that b 1=1, the processing device may store the accumulator value 2A+P in register R(1) (324) and store the new fixed value P in register R(0) (326).

Prior to starting the next iteration identified by the key bit $k_{j+1}$, the processing device may perform additional randomization of the values stored in R(0) and R(1) by projective scaling using random numbers $Z_{R(0)}$ and $Z_{R(1)}$, as shown by blocks 330, 332, 334, and 336, which may be performed similarly to blocks 230, 232, 234, and 236 of the Montgomery ladder algorithm. At the beginning of the j+1-th iteration of the Double-Add ladder algorithm, the processing device may retrieve the current value of the accumulator and the value P stored in R(0) and R(1). The processing device may have to account for a possibility that the shuffle operation during the previous j-th iteration may have resulted in the accumulator value being stored in R(1) and the value P being stored in R(0). The processing device may access the value of the random number $b_j$ and load the values from R(0) and R(1) differently depending on whether $b_j$=0 or $b_j$=1. For example, if $k_{j+1}$=0, the processing device may determine that during the previous j-th iteration of the algorithm the random number had the value $b_j$=0, so that the accumulator value is currently being stored in R(0). The processing device may therefor compute the value 2R(0) and identify it is the new value of the accumulator 340 equal to 2(2A+P), as indicated by the left dashed line at the bottom of FIG. 3A. The processing device may identify the value stored in R(1) as the value P, as illustrated by the right dashed line at the bottom of FIG. 3A. If, on the other hand, the processing device determines that during the previous j-th iteration of the algorithm the random number had the value $b_j$=1, the processing device may compute the value 2R(1) and identify it as the new accumulator 340, as indicated by the left solid line at the bottom of FIG. 3A. The processing device may also identify the value stored in R(0) as the value P, as illustrated by the right solid line leading to block 342 in FIG. 3A. In an instance where the new key bit $k_{j+1}$=1, the processing device may compute the value 2R(0)+R(1) and identify it as the new accumulator value if $b_j$=0, or compute 2R(1)+R(0) and identify it as the new accumulator value if $b_j$=1.

The determined values of the accumulator 340 and the auxiliary number 342 may be stored using conditional swapping (shuffling), as described above. The processing device may deploy the random number generator to generate a new random number $b_{j+1}$ and determine, based on $b_{j+1}$, how the accumulator 340 and the number P 342 are to be stored in R(0) and R(1). If $b_{j+1}$=0 (no swapping), the accumulator 340 may be stored in register R(0) and the number P 342 may be stored in register R(1). If $b_{j+1}$=1 (swapping), the accumulator 340 may be stored in register R(1) and the number P 342 may be stored in register R(0).

The operations performed by the processing device during the j+1-th iteration may be summarized as follows, in one exemplary implementation, wherein the notation $R_j(n)$ stands for the content of the n-th register after the j-th iteration of the Double-Add ladder algorithm:

$$R_{j+1}(b_{j+1} XOR 0) \leftarrow 2R_j(b_j XOR 0) + [k_{j+1} XOR 0] * R_j(b_j XOR 1),$$

$$R_{j+1}(b_{j+1} XOR 1) \leftarrow R_j(b_j XOR 1).$$

Figure 3B:
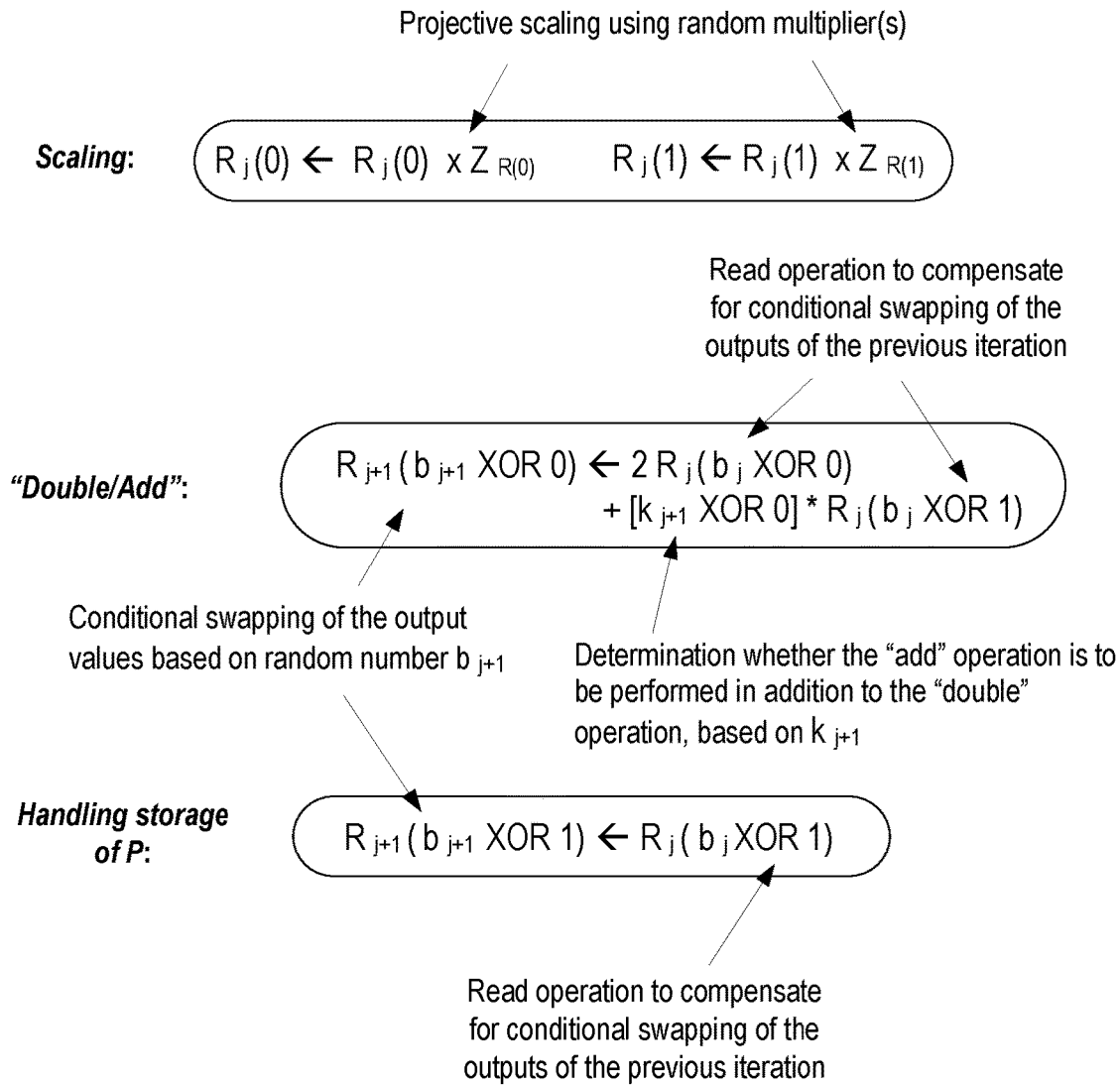
FIG. 3B illustrates intermediate randomization operations, in accordance with one or more aspects of the present disclosure, that may be implemented to protect execution of the Double-Add ladder algorithm from side-channel attacks.

FIG. 3B illustrates these intermediate randomization operations 350, in accordance with one or more aspects of the present disclosure, which may be implemented to protect execution of the Double-Add ladder algorithm from side-channel attacks. These operations, as illustrated in FIG. 3B may include: adjustment of the read operations to compensate for the randomization (swapping) that may have been performed at the end of the previous j-th iteration; determination whether the "add" operation is to be performed in addition to the "double" operation based on the value $k_{j+1}$; and conditional swapping of the outputs based on the value of the random $b_{j+1}$. Also shown in FIG. 3B is the projective scaling operation, which may be performed at the end of the previous j-th iteration (as indicated), or after the input values are read from the registers R(0) and R(1) during the j+1-th iteration but before the "double" or "double-add" operations are performed, or after the "double" or "double-add" operations are performed, and so on.

Protection of cryptographic operations by intermediate randomization may be performed for other multiplication algorithms in a manner similar to the one described in relation to the Montgomery ladder and the Double-Add ladder shown in FIGS. 2A-B and 3A-3B, respectively. For example, the operations performed by the processing device during j+1-th iteration of the Joye Double-Add ladder may be summarized as follows, in one exemplary implementation (wherein iterations are performed in the right-to-left order, so that $k_0$ is the least significant bit):

$$R_{j+1}(b_{j+1}XORk_{j+1}XOR1) \leftarrow 2R_j(b_jXORk_{j+1}XOR1) + R_j(b_jXORk_{j+1}XOR0),$$

$$R_{j+1}(b_{j+1}XORk_{j+1}XOR0) \leftarrow R_j(b_jXORk_{j+1}XOR0).$$

As described earlier, in each iteration of the Joye Double-Add algorithm, one of the registers retains its stored value while the other register stores the result of the Double and Add operation, depending on the current bit value $k_{j+1}$. The random bit value $b_j$ of the previous iteration controls which input value is stored in which register prior to the j+1-th iteration, while the random bit value $b_{j+1}$ indicates where the output value are to be stored.

In some implementations of the cryptographic ladder algorithms, more than two memory registers R(0), R(1), ... R(N−1) may store N intermediate values A(0), A(1), A(2), ... that may be used in successive iterations of these algorithms. The protection by intermediate randomization may be used in N-value algorithms similarly to the Montgomery ladder and the Double-Add ladder algorithms described above. For example, at the end of an iteration of an N-value algorithm, after the processing device has computed the N values A(i), the processing device may depart from a standard storing procedure, e.g., where A(i) value is stored in the register R(i). Instead, in one implementation, the processing device may generate a random number s, which may be a number between 0 and N, and assign the value A(1) to the register R(s). Next, the processing device may generate another random number 1, which may be a number between 0 and N, but excluding s, and store the value A(2) in the register R(t), and so on. The random numbers s, t . . . may be multi-bit numbers represented by $\log_2 N$ bits (or an integer number of bits not less than $\log_2 N$, if N is not a power of 2). Other procedures of randomly distributing N values A(0), A(1), A(2), . . . to N registers R(0), R(1), . . . R(N−1) may, alternatively, be implemented. At the beginning of the next iteration of the algorithm, the processing device may determine what output distribution procedure was implemented during the preceding iteration (e.g., the values of the random numbers s, t . . . ) and what registers are currently storing the values A(0), A(1), A(2), . . . , and retrieve these values therefrom. In the meantime, e.g., between storing the values A(0), A(1), A(2), . . . and retrieving them, the processing device may perform projective scaling of the values A(0), A(1), A(2), . . . , using random multipliers $R_{R(0)}$, $R_{R(1)}$, $R_{R(2)}$, . . . , as described above in relation to the Montgomery and the Double-Add ladder algorithms. Some or all of the random multipliers may be the same. The projective scaling randomization may alternatively (or additionally) be performed at any other time during execution of an algorithm iteration.

The randomizations—random projective scaling and random distribution of the intermediate outputs—may be performed during each iteration of the algorithm, in some implementations. In some implementations, the randomizations may be performed in a fixed order for each iteration, e.g., the random projective scaling may be performed at the beginning of each iteration before the registers are read out, or after the computations of the iteration are completed but before the outputs are stored. In some implementations, the order of randomizations may be pre-determined before the algorithm is applied to a specific multiplication task. For example, it may be pre-determined that random projective scaling is to be performed at the beginning of iterations 0, 4, 6, and prior to storing outputs in iterations 1, 2, 3, 5. In some implementations, to make side-attacks more difficult, the exact instances of randomizations may themselves be determined randomly. For example, prior to a particular iteration of the algorithm, the random number generator may indicate whether an output randomization is to be performed during the iteration. Similarly, the random number generator may indicate whether the projective scaling randomization is to be performed during the iteration. The two determinations may be independent from each other. The random number generator may also indicate where exactly, within the iteration, the projective scaling randomization is to be performed.

Figure 4:
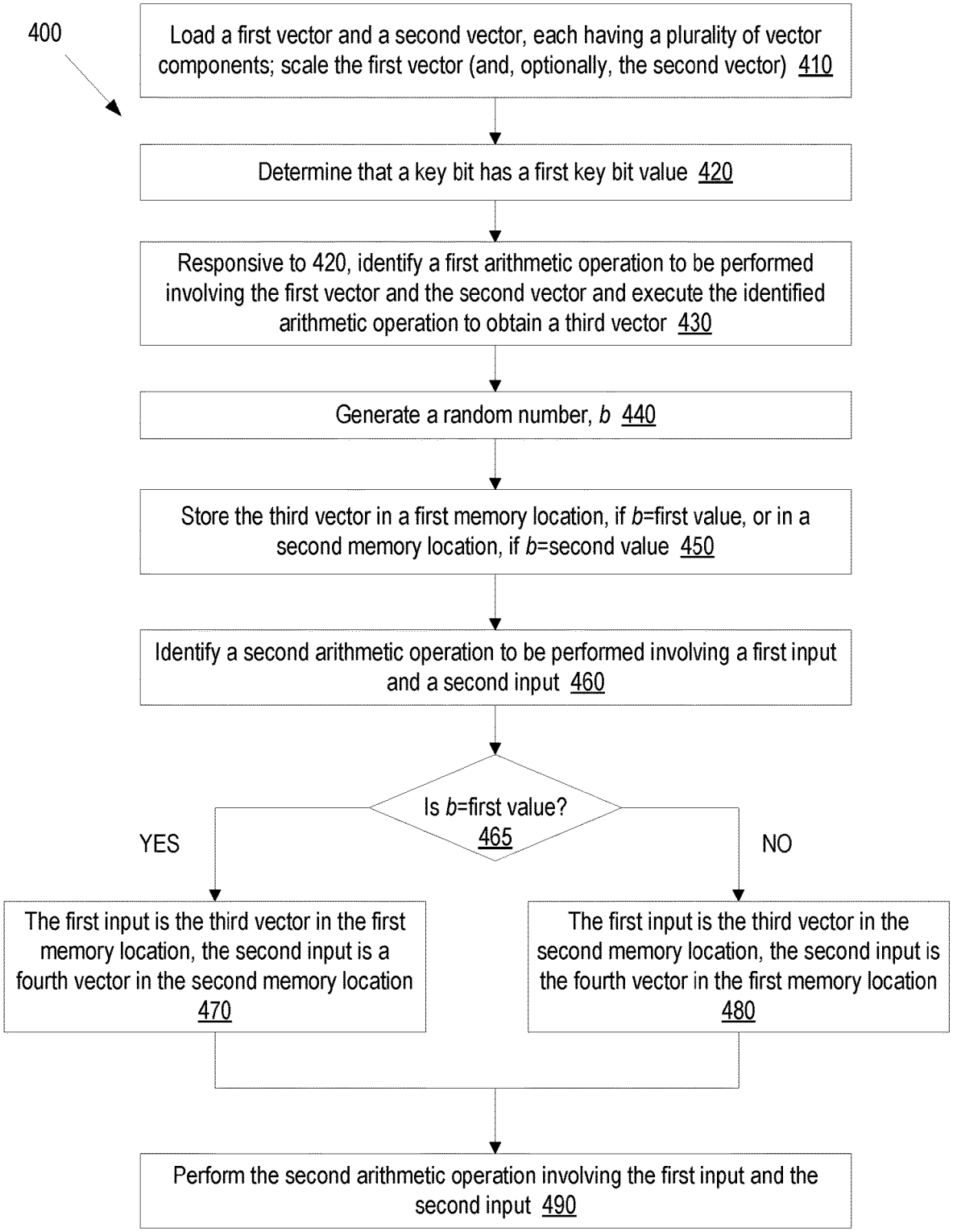
FIG. 4 depicts a flow diagram of an illustrative example of method of protecting cryptographic operations by intermediate randomization, in accordance with one or more aspects of the present disclosure.

FIG. 4 depicts a flow diagram of an illustrative example of method 400 of protecting cryptographic operations by intermediate randomization, in accordance with one or more aspects of the present disclosure. Method 400 and/or each of its individual functions, routines, subroutines, or operations may be performed by one or more processing units of the computing system implementing the methods, e.g., a processor containing the ALU 110. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other. Various blocks of the method 400 may be performed in a different order compared to the order shown in FIG. 6. Some blocks may be performed concurrently with other blocks. Some blocks may be optional.

The method 400 may be implemented by the processor/ALU performing a cryptographic operation, which may involve a public key number and a private key number, two private key numbers, and so on. The cryptographic operation may be a part of a larger computational operation involving multiple private key numbers and/or multiple public key numbers. The cryptographic operation may involve points in a cryptographic space. The cryptographic space may be a space of points belonging to an elliptic curve or any other object (a line, a surface, a volume, etc.) for which rules that specify how doubling and addition operations are to be performed. A point in the cryptographic space may be identified by a vector having a plurality of vector components. For example, in case where the cryptographic space is a line (e.g., an elliptic curve), a base point may be identified by vector components that are affine coordinates $P=(x_P, y_P)$ or by projective coordinates $P=(X_P, Y_P, Z_P)$ of the base point P. Similarly, working points, e.g. A, B, etc., at each iteration of the algorithm being implemented, may be identified by vector components that may be the corresponding affine coordinates $A=(x_A, y_A)$, $B=(x_B, y_B)$ or the projective coordinates $A=(X_A, Y_A, Z_A)$, $B=(X_B, Y_B, Z_B)$ of the working points. The number of vector components may be more than three, in some implementations. One of the vectors may be an accumulator (e.g., A) and the other vector(s) (e.g., B) may be an auxiliary vector(s). The auxiliary vector may be used to improve efficiency of the cryptographic operation. In some implementations, the second vector may represent the accumulator and the first vector may represent the auxiliary vector. The auxiliary vector may represent a public key P (e.g., as in Double-Add ladder algorithm) or be a combination A+P of the accumulator value and the public key P (as in Montgomery ladder algorithm), or any other number that may be used by a specific cryptographic algorithm. In some implementations, the first and/or the second vector may change between successive iterations of the algorithm (e.g., as both the accumulator and the auxiliary vector change in the Montgomery ladder algorithm). In some implementations, the first or the second vector may remain fixed between successive iterations of the algorithm (e.g., as the auxiliary vector remains fixed in the Double-Add ladder algorithm). In some implementations, any of the vectors—representing working points, base points, auxiliary points, etc.—may have only one component (in which case a single number may represent the corresponding vector).

A state of the algorithm, $S=(P, A, B, \ldots, u, w, z, \ldots)$ at its particular iteration, may be characterized by a number of vectors (such as vectors P, A, B) and a number of additional parameters $u, w, z, \ldots$, which may be one-component numbers or multi-component vectors. For example, u may be a slope of a line that connects a particular point (e.g., B) with some other point (e.g., A or P); z may be an additional scaling factor; and so on. In some implementations, some of the components of the vectors may be elided. For example, a given point A may be uniquely identified by its $X_A$, $Z_A$ components (or $Y_A$, $Z_A$, or $X_A$, $Y_A$), so that the third component, carrying a redundant information may be omitted. In some implementations, a state of the algorithm may be represented with the difference of some vectors, $S=(P, A-P, B-P, \ldots, u, w, z, \ldots)$. In some implementations, some of the vector components may be shared by some vectors. For example, in various co-z algorithms, some or all of the components $Z_P$, $Z_A$, $Z_B$ may be the same (and may further coincide with the "global" parameter z of the state S of the algorithm (at its particular iteration).

At block 410, the processing device performing method 400 may load a first vector and a second vector, such that the first vector includes a plurality of first vector components identifying a first point in a cryptographic space and the second vector includes a plurality of second components identifying a second point in the cryptographic space. The processing device may then obtain a scaled first vector by modifying at least some of the plurality of first vector components so that the scaled first vector identifies the same first point in the cryptographic space Optionally, the processing device may also obtain a scaled second vector by modifying at least some of the plurality of second vector components so that the scaled second vector identifies the same second point in the cryptographic space.

Scaling of the first vector (and, similarly, the second vector, if applicable) may be projective scaling and may include modifying at least some of the plurality of vector components so that the modified plurality of vector components identifies the same point in the cryptographic space (e.g., elliptic curve). In some implementations, where the elliptic curve is a Weierstrass curve, modifying the plurality of vector components may include multiplying some or all vector components by an integer power of a random factor. For example, modifying the plurality of vector components may include (i) multiplying a first vector component by a random factor R, multiplying a second vector component a square of the random factor, $R^2$; and/or multiplying a third vector component by a cube of the random factor, $R^3$.

Scaling of the first vector (and, optionally, the second vector) may also include updating auxiliary information, which, together with the first vector components and the second vectors components may identify a current arithmetic state of the ladder. For example, the auxiliary information may identify correspondence between the first vector components and the first point in the cryptographic space (e.g., elliptic curve) and similarly identify correspondence between the second vector components and the second point in the cryptographic space. The updated auxiliary information may identify correspondence between the modified first and second vector components and the respective points in the cryptographic space. The auxiliary information may be stored in additional registers different from the registers used to store the first vector components and the second vector components. In various implementations, the auxiliary information may include the random factor R (for one or both vectors, if the respective random factors are different from each other), the running value Z (for one or both vectors) of the z-coordinate (e.g., the previous value of the z-coordinate multiplied by the random factor R), the X and/or Y coordinates of the base point P (possibly scaled with the running value Z or some other value), the slope of the line connecting the base point with the first and the second points in the cryptographic space, and so on. In some implementations, where some of the components of the first vector and/or the second vector (e.g., X or Y) components are elided from the respective vectors, some of the elided component(s) may be stored in the auxiliary information.

To protect the cryptographic operation from potential side-channel attacks, the processing device performing method 400 may projectively scale the first vector (at block 410), multiplying it by some random number. Projective scaling may modify the components of the first vector without changing the point in the cryptographic space identified by the vector components. In some implementations, both the first and the second vectors may be projectively scaled by multiplying the first and the second vectors by the same or different random numbers.

Computations that are to be performed during various iterations of the cryptographic operation may depend on the value of a key bit $k_j$ (e.g., of the private key k) that corresponds to the current iteration being executed. For example, in the Double-Add ladder algorithm, the key bit value may determine if the "double" arithmetic operation or the "double-and-add" arithmetic operation is to be performed. In the Montgomery ladder algorithm, the key bit value may determine whether the "double" operation is to be performed on the accumulator or the auxiliary vector. At block 420, the processing device may determine that the key bit $k_j$ has a first key bit value (which may be 1 or 0). The method 400 may continue with identifying, responsive to determining that the key bit has the first key bit value, a first arithmetic operation to be performed on the scaled first vector and the (scaled) second vector (430). For example, the first arithmetic operation may be an add operation (where the scaled first vector is added to the (scaled) second vector), a double-and-add operation (where the (scaled) second vector is added to the a double of the scaled first vector), or some other operation defined by the specific algorithm implemented by the processing device. The processing device may perform (execute) the identified operation on the scaled first vector and the (scaled) second vector to obtain a third vector (430).

The method 400 may continue with generate a random number, b (440) to determine where in a memory device the third number is to be stored. The random number b may be a one-bit number, if there are two possible memory locations (registers) in the memory device where the third number may be stored. Alternatively, the random number b may be a multi-bit number if there are more than two possible memory locations where the third vector may be stored. At block 450, the processing device may store the third vector in a first memory location, responsive to the random number having a first value (e.g., 0 or 1), or in a second memory location, responsive to the random number having a second value (e.g. 1 or 0). The processing device may also perform additional arithmetic operations (successively or in parallel to the first arithmetic operation) on the scaled first vector and/or the (scaled) second vector and obtain additional outputs, e.g., a fourth vector. For example, if the first arithmetic operation to determine the third vector is the "add" operation of the Montgomery ladder, the additional operation may be the "double" operation to be performed on the scaled first or the (scaled) second vector to obtained the fourth vector. The fourth vector may be stored in the first memory location, responsive to the random number having the second value (e.g., 1 or 0), or in the second memory location, responsive to the random number having the first value (e.g., 0 or 1). The first arithmetic operation and the second arithmetic operation may be modular arithmetic operations.

At block 460, which may be performed during the next (e.g., j+1-th) iteration of the algorithm, the processing device may read out the vectors stored in the first memory location and/or the second memory location and use these vectors as inputs for a second arithmetic operation. The second arithmetic operation may be identified based on the value of the key bit $k_{j+1}$ (which corresponds to the j+1-th iteration). For example, responsive to determining that the key bit $k_{j+1}$ has the first key bit value (e.g., 0 or 1), the processing device may identify that the second arithmetic operation is the same as the first arithmetic operation. Alternatively, responsive to determining that the key bit $k_{j+1}$ has a second key bit value (e.g., 1 or 0), the processing device may identify the second arithmetic operation as different from the first arithmetic operation. For example, in implementations of the Montgomery ladder, the first arithmetic operation may be an "add" operation, whereas the second operation arithmetic operation may be the "double" operation (or vice versa).

Having identified the second arithmetic operation to be performed based on the key bit value $k_{j+1}$ and determined what types of inputs are associated with the second arithmetic operation, the processing device may also access the value b used during the preceding iteration for output distribution and use it in the decision-making block 465. The processing device may select a first input and a second input for the second arithmetic operation based on the random number value b having the first value (e.g., 0 or 1) or the second value (e.g., 1 or 0). For example, the first input may be the third vector stored in the first memory location and the second input may be the fourth vector stored in the second memory location (if b has the first value) (470). Alternatively, the first input may be the third vector stored in the second memory location and the second input may be the fourth vector stored in the first memory location (if b has the second value) (480).

Upon loading the first and the second inputs as described, the processing device may perform the second arithmetic operation on the first input and the second input 4). As a result, the outcome of the second arithmetic operation is to remain the same regardless of how the outputs of the first arithmetic operation were stored at the end of the previous, j-th, iteration. In essence, the b-contingent loading of the inputs at the beginning of the j+1-th iteration reverses b-contingent storing of the outputs at the end of the j-th iteration, while introducing randomization operations that make it more difficult for an adversary to correlate emissions from the processing device among various operations of the algorithm being performed. Accordingly, this makes it harder for the adversary to mount a successful side-channel attack.

Any arithmetic operations described in reference to FIGS. 2A, 2B, 3A, 3B, and 4 may be modular arithmetic operations.

Figure 5:
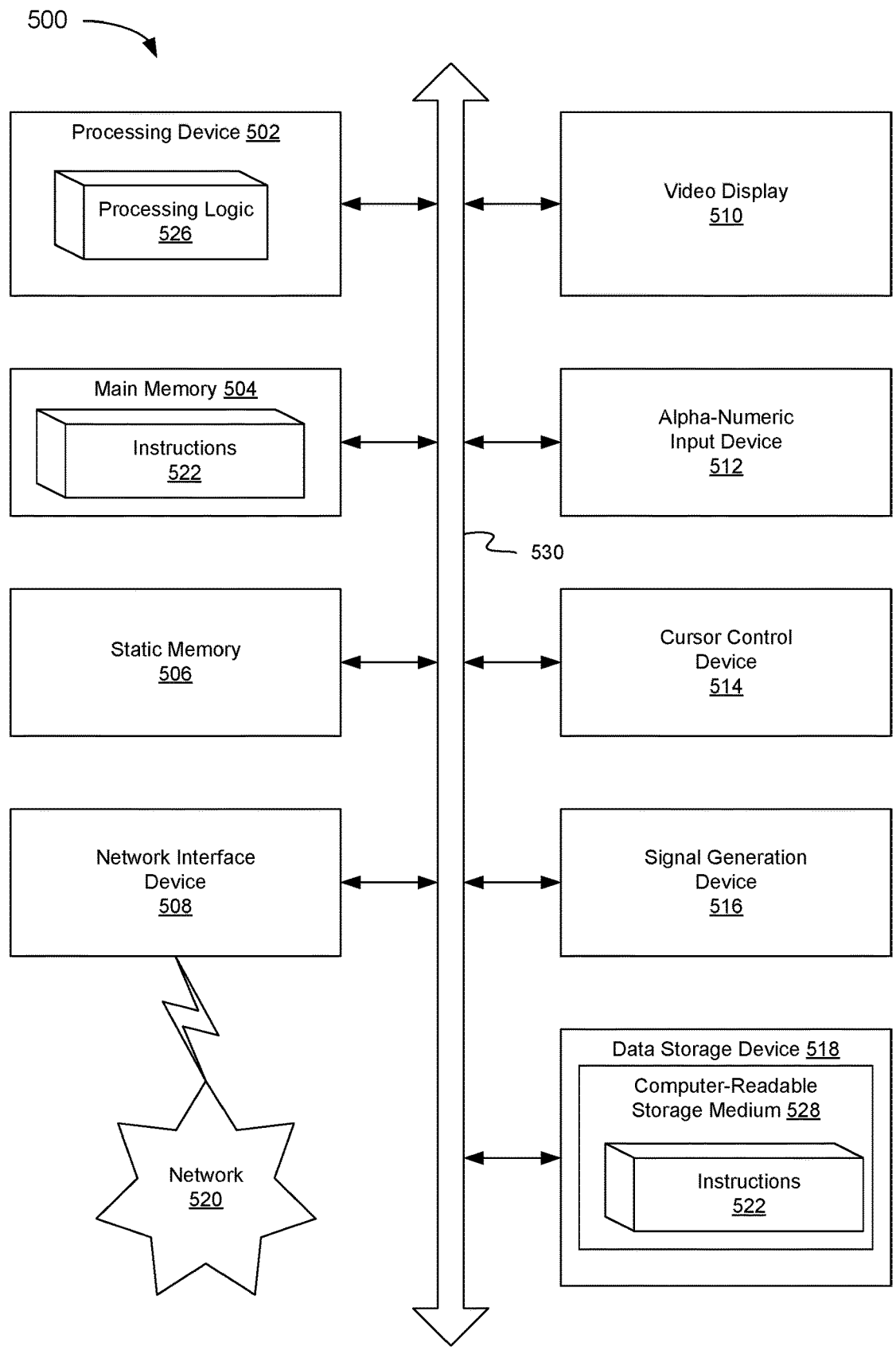
FIG. 5 depicts a block diagram of an example computer system operating in accordance with one or more aspects of the present disclosure.

FIG. 5 depicts a block diagram of an example computer system 500 operating in accordance with one or more aspects of the present disclosure. In various illustrative examples, computer system 500 may represent the processing device 100, illustrated in FIG. 1.

Example computer system 500 may be connected to other computer systems in a LAN, an intranet, an extranet, and/or the Internet. Computer system 500 may operate in the capacity of a server in a client-server network environment. Computer system 500 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 500 may include a processing device 502 (also referred to as a processor or CPU), a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory (e.g., a data storage device 518), which may communicate with each other via a bus 530.

Processing device 502 represents one or more general-purpose processing devices such as a microprocessor, central processing unit, or the like. More particularly, processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 502 may be configured to execute instructions implementing method 400 of protecting cryptographic operations by intermediate randomization.

Example computer system 500 may further comprise a network interface device 508, which may be communicatively coupled to a network 520. Example computer system 500 may further comprise a video display 510 (e.g., a liquid crystal display (LCD), a touch screen, or a cathode ray tube (CRT)), an alphanumeric input device 512 (e.g., a keyboard), a cursor control device 514 (e.g., a mouse), and an acoustic signal generation device 516 (e.g., a speaker).

Data storage device 518 may include a computer-readable storage medium (or, more specifically, a non-transitory computer-readable storage medium) 528 on which is stored one or more sets of executable instructions 522. In accordance with one or more aspects of the present disclosure, executable instructions 522 may comprise executable instructions implementing method 400 of protecting cryptographic operations by intermediate randomization.

Executable instructions 522 may also reside, completely or at least partially, within main memory 504 and/or within processing device 502 during execution thereof by example computer system 500, main memory 504 and processing device 502 also constituting computer-readable storage media. Executable instructions 522 may further be transmitted or received over a network via network interface device 508.

While the computer-readable storage medium 528 is shown in FIG. 5 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method to perform a cryptographic operation, the method comprising:

loading, by a processing device, a first vector and a second vector, wherein the first vector identifies a first point in a cryptographic space and the second vector identifies a second point in the cryptographic space, wherein one of the first vector or the second vector is associated with an input message, and wherein another one of the second vector or the first vector is associated with a cryptographic key for the cryptographic operation;

scaling, by the processing device, a first vector, wherein the scaled first vector identifies the same first point in the cryptographic space;

responsive to determining that a key bit has a first key bit value, identifying a first arithmetic operation to be performed involving the scaled first vector and the second vector;

performing, by the processing device, the first arithmetic operation involving the scaled first vector and the second vector to obtain a third vector;

generating a random number;

storing the third vector in (i) a first memory location, responsive to the random number having a first value, or (ii) a second memory location, responsive to the random number having a second value; and performing, by the processing device, a second arithmetic operation involving a first input and a second input, wherein, based on the random number having the first value or the second value:

the first input comprises the third vector stored either in the first memory location or the second memory location; and the second input comprises a fourth vector stored either in the second memory location or the first memory location; and using an output of the second arithmetic operation to obtain an output of the cryptographic operation comprising at least one of an encryption of the input message, a decryption of the input message, or a digital signature of the input message.

2. The method of claim 1, further comprising:
scaling, by the processing device, a second vector, wherein the scaled second vector identifies the same second point in the cryptographic space.

3. The method of claim 1, wherein the first arithmetic operation comprises adding the scaled first vector to the second vector.

4. The method of claim 1, wherein the first arithmetic operation comprises adding the second vector to a double of the scaled first vector.

5. The method of claim 1, further comprising:
responsive to determining that the key bit has the first key bit value, performing an additional arithmetic operation involving the scaled first vector or the second vector to obtain the fourth vector.

6. The method of claim 5, further comprising:
storing the fourth vector in (i) the first memory location, responsive to the random number having the second value, or (ii) in the second memory location, responsive to the random number having the first value.

7. The method of claim 5, wherein the fourth vector is a double of the scaled first vector or a double of the second vector.

8. The method of claim 1, wherein the first arithmetic operation and the second arithmetic operation are modular arithmetic operations.

9. The method of claim 1, wherein the cryptographic space is a space of points belonging to an elliptic curve.

10. The method of claim 1, wherein the first vector comprises a plurality of first vector components and wherein the second vector comprises a plurality of second vector components, and wherein scaling the first vector comprises:
modifying at least some of the plurality of first vector components; and
updating auxiliary information, wherein the auxiliary information identifies correspondence between the modified first vector components and the first point in the cryptographic space.

11. The method of claim 10, wherein scaling the first vector comprises:
multiplying a first component of the plurality of first vector components by a random factor; and
multiplying a second component of the plurality of first vector components by an integer power of the random factor; and
updating the auxiliary information with the random factor.

12. The method of claim 1, wherein the random number is a one-bit number.

13. The method of claim 1, wherein performing the second arithmetic operation is responsive to determining that a new key bit has the first key bit value, and wherein the second arithmetic operation is the same as the first arithmetic operation.

14. The method of claim 1, wherein performing the second arithmetic operation is responsive to determining that a new key bit has a second key bit value, and wherein the second arithmetic operation is different from the first arithmetic operation.

15. A system to perform a cryptographic operation, the system comprising:
a memory device to store a first vector and a second vector; and
a processor coupled to the memory device to:
load, from the memory device, a first vector and a second vector, wherein the first vector identifies a first point in a cryptographic space and the second vector identifies a second point in the cryptographic space, wherein one of the first vector or the second vector is associated with an input message, and wherein another one of the second vector or the first vector is associated with a cryptographic key for the cryptographic operation;
scale a first vector, wherein the scaled first vector identifies the same first point in the cryptographic space;
responsive to determining that a key bit has a first key bit value, identify a first arithmetic operation to be performed involving the scaled first vector and the second vector;
perform the first arithmetic operation involving the scaled first vector and the second vector to obtain a third vector;
generate a random number;
store the third vector in (i) a first memory location, responsive to the random number having a first value, or (ii) a second memory location, responsive to the random number having a second value; and
perform a second arithmetic operation involving a first input and a second input, wherein, based on the random number having the first value or the second value:
the first input comprises the third vector stored either in the first memory location or the second memory location; and
the second input comprises a fourth vector stored either in the second memory location or the first memory location, and
use an output of the second arithmetic operation to obtain an output of the cryptographic operation comprising at least one of an encryption of the input message, a decryption of the input message, or a digital signature of the input message.

16. The system of claim 15, wherein to perform the second arithmetic operation the processor is to determine that a new key bit has the first key bit value, and wherein the second arithmetic operation is the same as the first arithmetic operation.

17. The system of claim 15, wherein to perform the second arithmetic operation the processor is to determine that a new key bit has a second key bit value, and wherein the second arithmetic operation is different from the first arithmetic operation.

18. A non-transitory computer-readable medium storing instruction thereon, wherein the instructions, when executed by a processing device performing a cryptographic operation, cause the processing device to:
load, from a memory device, a first vector and a second vector, wherein the first vector identifies a first point in a cryptographic space and the second vector identifies a second point in the cryptographic space, wherein one of the first vector or the second vector is associated with an input message, and wherein another one of the second vector or the first vector is associated with a cryptographic key for the cryptographic operation;

scale a first vector, wherein the scaled first vector identifies the same first point in the cryptographic space;

responsive to determining that a key bit has a first key bit value, identify a first arithmetic operation to be performed involving the scaled first vector and the second vector;

perform the first arithmetic operation involving the scaled first vector and the second vector to obtain a third vector;

generate a random number;

store the third vector in (i) a first memory location, responsive to the random number having a first value, or (ii) a second memory location, responsive to the random number having a second value; and perform a second arithmetic operation involving a first input and a second input, wherein, based on the random number having the first value or the second value:

the first input comprises the third vector stored either in the first memory location or the second memory location; and the second input comprises a fourth vector stored either in the second memory location or the first memory location; and use an output of the second arithmetic operation to obtain an output of the cryptographic operation comprising at least one of an encryption of the input message, a decryption of the input message, or a digital signature of the input message.

19. The non-transitory computer-readable medium of claim 18, wherein the first arithmetic operation comprises adding the scaled first vector to the second vector or adding the second vector to a double of the scaled first vector.

20. The non-transitory computer-readable medium of claim 18, wherein the first vector comprises a plurality of first vector components and wherein the second vector comprises a plurality of second vector components, and wherein to scale the first vector the instructions are to cause the processing device to modify at least some of the plurality of first vector components.

* * * * *